March 20, 1956  L. A. PHILIPP  2,738,651
REFRIGERATING APPARATUS
Filed Feb. 7, 1955
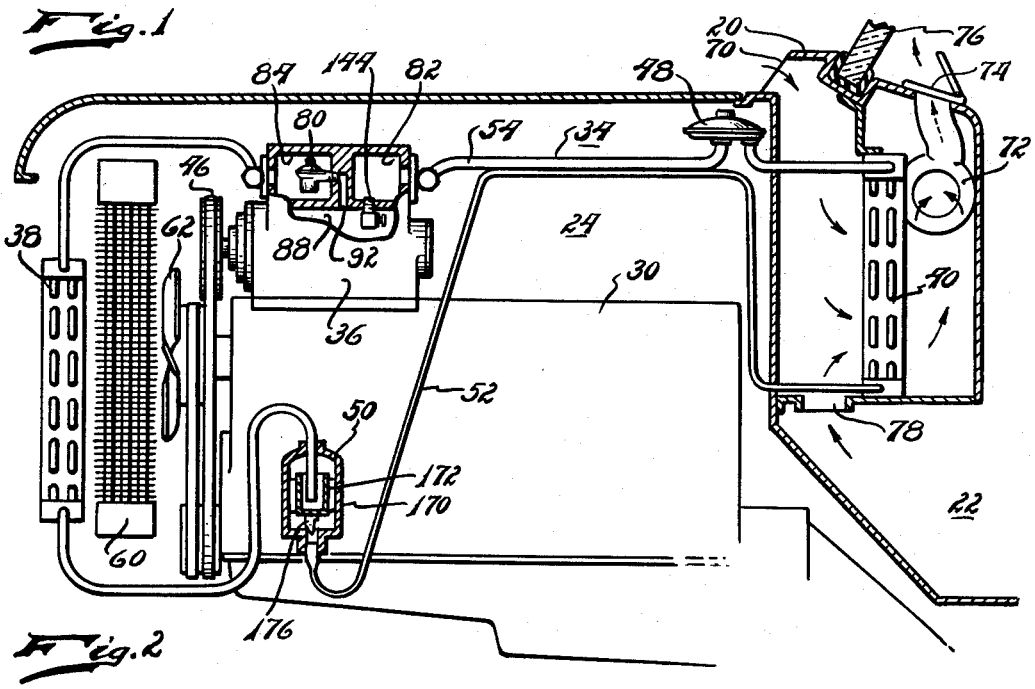
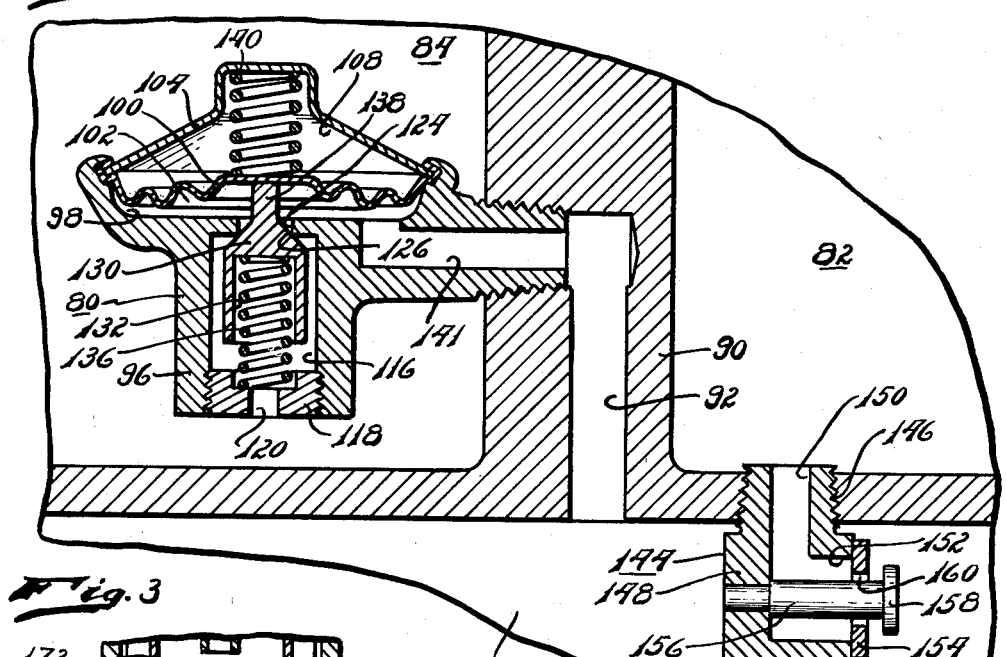
INVENTOR.
LAWRENCE A. PHILIPP
BY
Ralph E. Baker
ATTORNEY

United States Patent Office 2,738,651
Patented Mar. 20, 1956

2,738,651
REFRIGERATING APPARATUS

Lawrence A. Philipp, Detroit, Mich., assignor to American Motors Corporation, Detroit, Mich., a corporation of Maryland Application February 7, 1955, Serial No. 486,506

5 Claims. (Cl. 62—3)

This invention relates to refrigerating apparatus and more particularly to such apparatus which is utilized for the conditioning of air for the passenger compartments of automotive vehicles.

In the conditioning of air for the passenger compartments of automotive vehicles it has been the practice to operate a refrigerant compressor of a refrigerating system by connecting same to the vehicle engine. This arrangement is satisfactory provided the pressure on the lubricant in the compressor crankcase remains above atmospheric pressure. In the event the pressure on the lubricant is not maintained above atmospheric such lubricant foams considerably upon initiation of compressor operation which results in destruction of the compressor valves and the removal of such lubricant from the compressor crankcase where it is needed to lubricate the moving parts thereof. Furthermore such compressors are of the so-called open type wherein the crankshaft thereof extends through a wall of the compressor crankcase so that the same may be driven by a pulley-belt arrangement connected to the engine of the vehicle. Such shafts are sealed by shaft seals to prevent the leakage of lubricant from the crankcase and to prevent the infiltration of air into the refrigerating system. By maintaining the pressure on the lubricant above atmospheric pressure there is insured an effective seal so that there is no infiltration of air into the system and the lubricant does not foam to an appreciable extent upon initiation of compressor operation.

It has been previously proposed to utilize magnetic or other type of clutches to disengage the compressor from its driving connection with the vehicle engine when the conditioning of air is not needed. In my invention it is an object to eliminate the necessity of such clutches.

Another object of my invention is to provide an improved arrangement for the continuous operation of a refrigerant compressor of a refrigerating system.

It is another object of my invention to maintain the pressure in a crankcase of a refrigerant compressor above atmospheric pressure so as to minimize the foaming of lubricant upon initiating operation thereof and to insure an effective seal about the compressor crankshaft at the place it extends through the crankcase housing.

Another object of my invention is to deliver refrigerant from the discharge side of a refrigerant compressor to the crankcase thereof in an amount which is sufficient to maintain a pressure above atmospheric on the lubricant in such crankcase.

Another object of the present invention is to provide an improved refrigerating system having the refrigerant compressor directly coupled to be driven during the operation of an engine of a motor vehicle so that when the refrigerant compressor is stopped due to either a failure in operation or a deliberate stopping of the engine, the refrigerant pressure within the system will rapidly and almost instantly be balanced so that the refrigerant pressure on the suction and discharge sides of the compressor will be equalized thereby unloading the compressor to permit an easier and readier restart of the engine.

Further objects and advantages of the present invention will be apparent from the following description, reference being had to the accompanying drawings, wherein a preferred form of the present invention is clearly shown.

In the drawings:

Fig. 1 is a diagrammatic illustration of a refrigerating system and automotive vehicle embodying features of my invention;

Fig. 2 is an enlarged fragmentary view in cross section of the compressor shown in Fig. 1, embodying features of my invention; and Fig. 3 is an enlarged fragmentary view of float valve embodying features of my invention.

In accordance with my invention I provide a refrigerating system for the conditioning of air for the passenger compartments of motor vehicles. In this system the compressor is driven by the engine of the vehicle and is arranged to be in operation continuously with the operation of the engine to thus eliminate the use of clutches. In order to prevent the possibility of reducing the pressure on the lubricant in the crankcase of the compressor below atmospheric pressure I have arranged to deliver some refrigerant vapors from the discharge side of the compressor into the crankcase thereof. This minimizes foaming of such lubricant and insures an effective seal of the crankshaft of the compressor. I have found that a pressure of approximately 8 pounds per square inch above atmospheric pressure is satisfactory for this purpose.

Referring to the drawings, the numeral 20 designates in general a motor vehicle having a passenger compartment 22 and an engine compartment 24. Within the engine compartment 24 is a variable speed engine 30.

A refrigerating system 34 is positioned within the vehicle 20 and is used for cooling the air entering the passenger compartment 22. The system includes in general, a compressor 36, a condenser 38 and a refrigerant evaporator 40. The compressor 36 is driven at variable speeds by the engine 30 continuously during operation of the engine through a pulley-belt arrangement designated in general by the numeral 46.

During operation of the engine 30 evaporated refrigerant is withdrawn from the evaporator 40 under the control of a pressure regulating valve 48 by the compressor 36 which compresses same and delivers it to the condenser 38 wherein it is liquified and from which it is delivered to the evaporator 40 under the control of a high side float 50 and a small diameter tube 52. The tube 52 is bonded to a suction or vapor return conduit 54 leading from the valve 48 to the intake side of the compressor 36 to cool the liquid in conduit 52 to prevent the formation of vapor in the conduit 52 to insure that only liquid will enter the evaporator 40. The tube or conduit 52 is of small diameter to keep the pressure up so that expansion will not take place at the outlet of valve 50. Under these conditions the expansion of refrigerant takes place at the inlet of the evaporator 40. The system 34 has a low pressure side leading from the inlet of the evaporator to the inlet of the compressor 36 including the crankcase thereof and a high pressure side leading from the outlet of the compressor to the inlet of the evaporator 40.

Positioned between the engine 30 and condenser 38 is the radiator 60 of the vehicle. The incoming air cools the condenser 38 and radiator 60 when the vehicle is in motion and a fan 62 driven by the engine 30 causes movement of air over the condenser and radiator during operation of the engine to dissipate heat from the condenser and the radiator.

The pressure regulating valve 48 may be of any of the well known types responsive to changes in pressures within the evaporator to throttle the outlet thereof and keep the pressure therein sufficiently high during conditions of operation. This prevents the evaporator from operating at an excessively low temperature that may cause excess condensation of moisture from the air being cooled to freeze out upon the surfaces of the evaporator.

During forward movement of the vehicle air enters same by ram pressure and in this instance it enters through a cowl ventilator opening 70 whence it passes over the evaporator 40 aided by the action of a fan 72. The cooled air enters the passenger compartment 22 from an outlet 74 adjacent the windshield 76 of the vehicle. This conditioned air is circulated throughout the compartment 22 and due to the action of the fan 72 it moves into opening 78 to again flow over the evaporator 40 for further conditioning. The opening 78 may be controlled by a damper (not shown). Various dampers and heaters (not shown) may be used for controlling and heating the air for compartment 22, however for the purpose of simplicity in disclosing this invention the same have been omitted. When the vehicle is not moving, the fan 72 circulates the air over the evaporator 40.

In order to maintain the pressure in the crankcase of the compressor at about 8 pounds per square inch above atmospheric pressure, I have provided a regulating valve designated in general by the numeral 80. This valve as disclosed is positioned in the interior of the compressor 36. The compressor includes an intake chamber 82, a discharge chamber 84, and a crankcase 88. The valve 80 is connected to a partition 90 between the two chambers. The chambers 82 and 84 are in communication with the compressor cylinders (not shown) of the compressor in the usual manner. The partition 90 is provided with a passageway 92 leading from the crankcase 88 to the outlet of the valve 80 to provide a communication passageway between the intake chamber 82 and the discharge chamber 84 which is controlled by the valve 80.

The pressure control valve 80 comprises a body 96 having a recessed portion 98 over which extends a diaphragm 100 for forming a chamber 102. Extending over the diaphragm 100 is a cover plate 104 to form a sealed chamber 108 at atmospherical pressure.

Formed in the body 96 of the valve is an inlet chamber 116 having an open end into which is threaded a plug 118 having a central bore 120 extending therethrough. The opposite end of chamber 116 communicates through a reduced opening 124 with chamber 98, and formed in the opening 124 is a valve seat 126 upon which is adapted to seat a valve needle 130. The valve needle 130 is bored axially, as at 132 into which extends a coil spring 136 whose opposite end engages plug 118 and which is adapted to urge the valve needle 130 to seat upon valve seat 126, closing the opening 124 leading to the chamber 102. The valve needle 130 is formed with an extension 138 extending through opening 124 to abut against diaphragm 100. When the valve needle 130 seats upon valve seat 126, the diaphragm is moved by the extension 138 against the compression of a coil spring 140. The coil spring 140 is positioned in chamber 108 between the cover plate 104 and the diaphragm for urging the diaphragm in the opposite direction. The chamber 116 is connected by an outlet passage 141 formed in valve body 96 with passage 92.

An oil return check and relief valve 144 is positioned and secured in a threaded passage 146 extending through partitioned wall 92 between suction chamber 82 and crankcase 88. The valve 144 provides controlled communication between the suction chamber 82 and crankcase 88. The valve 144 comprises a body 148 through which extends a passage 150 providing communication between chamber 82 and crankcase 88. Adapted to close the end or opening 152 of passage 150 is an annular ring 154 mounted on pin 156 secured to the body 148. The ring 154 is movable axially on said pin 156 toward the opening 152, and is limited in its movement away from the opening by pin head 158 of pin 156. The annular opening 160 of the ring 154 is slightly larger than the diameter of pin 156 which projects therethrough so that when the ring 154 moves to close the opening 152 a leakage may take place around the pin through opening 160. Oil separated from refrigerant and deposited in the chamber 82 will return to the crankcase through the valve 144. The valve 144 is a safeguard against a build-up of excessive pressures within the crankcase and in supplying the continuously operating compressor with a minimum flow of refrigerant the valve 144 is arranged to permit a flow of refrigerant from the crankcase to the inlet chamber 82. The ring 154 of the valve 144 normally seats over the opening 152 whenever the suction pressure within the chamber 82 decreases and allows a metered flow through the opening 160 to the chamber 82. Upon an increase in pressure in the suction chamber 82 the ring 154 may unseat from opening 152. The arrangement of the valve 144 also prevents slugs of oil passing to the suction chamber 82 during the initial start of the compressor after being idle when the pressure on the lubricant is being reduced as such pressure cannot be reduced as suddenly as in compressors not equipped with such valves.

When the engine is in operation and it is desired to condition the air for the compartment 22 the fan 72 is placed in operation so that the air entering opening 70 is caused to flow over the surfaces of the evaporator 40 to be cooled thereby. The fan may be manually started or it may be of the automatic thermostatically controlled type. When such air passes over the surface of the evaporator the refrigerant therein absorbs heat from the air which causes the refrigerant to vaporize. The vaporized refrigerant is withdrawn from the evaporator 40 by the compressor 36 under the control of the pressure operated regulating valve 48 which is responsive to changes in pressures in the evaporator 40. The valve 48 may remain completely closed when the pressure in the evaporator 40 is below a certain point at which time no refrigerant from the evaporator is being conducted to the suction chamber 82 or crankcase 88. However during periods when air conditioning is desirable and when the fan 72 is operating there will be sufficient vaporization take place in the evaporator 40 resulting in sufficient pressure therein to operate valve 48 thus permitting vaporous refrigerant to flow to the chamber 82 to maintain the pressure in the crankcase above atmospheric. The compressor 36 compresses such vaporous refrigerant and delivers it into the compressor discharge chamber 84 which is in open communication with the inlet of the condenser 38 and the inlet chamber 116 of valve 80. Some or all of this compressed refrigerant leaves the chamber 84 to move into the condenser to be condensed. If the pressure in the crankcase 88 is 8 pounds per square inch above atmospheric pressure or higher all of such compressed refrigerant flows into the condenser to be condensed. If the pressure in the crankcase falls below such 8 pounds per square inch the valve 80 opens to meter some of such compressed refrigerant into the crankcase 88 as is hereinafter described. The condensed refrigerant enters the high side float 50 which includes a casing 170 which houses a float bucket 172 which carries a valve proper 176 which is of the needle valve type. The valve 176 is machined or flattened on one side as at 180 to provide a so called cracked valve to provide an arrangement for unloading the compressor when the compressor stops for any reason. During operation liquid refrigerant enters bucket 172 and overflows causing the bucket to rise as the level of liquid rises in casing 170 to thus lift valve 176 from its seat to meter the flow of liquid refrigerant to the evaporator in the usual manner. When the compressor stops, the valve 176 due to cut away portion 180, permits the pressures on the high and low pressure sides of the system to equalize since refrigerant vapors are free to pass through the cracked valve. The unloading takes place in a matter of seconds and permits an easier start of the engine 30.

When the pressure in the crankcase is above a certain value, for example, 8 pounds per square inch above atmospheric, such pressure acts on the underside of diaphragm 100 with the aid of spring 136 and against the action of spring 140 to keep valve 80 closed. The underside of diaphragm 100 is in open communication with the crankcase 88 through passages 92 and 141. When the pressure in the crankcase falls below such certain value the spring 140 will overcome the action of such pressure and the spring 136 to cause the valve 80 to open and thus meter the flow of compressed high pressure refrigerant from the discharge chamber 84 through passages 141 and 92 into the crankcase 88. When sufficient compressed refrigerant is passed into the crankcase to raise the pressure above said certain value such pressure acting on the underside of diaphragm 100 and with the action of the spring 136 will cause the valve 130 to engage its seat 126 to thus close the valve 80.

In view of the fact that the compressor 36 operates at all times when the engine 30 is in operation the valve 80 is provided. During periods when air conditioning is not desired and the fan is not in operation there may not be sufficient vaporization take place in the evaporator to cause operation of valve 48 and no refrigerant would move from the evaporator to the suction chamber of the compressor thus resulting in a reduction in pressure in the crankcase. However, due to valve 80 such pressure will not fall below the aforesaid certain value. At all times the pressure on the high pressure or condenser side of the system remains at least 8 pounds per square inch above atmospheric pressure regardless of environment temperature. Under these conditions the valve 80 is always prepared to meter the flow of compressed refrigerant to the crankcase to keep the pressure therein above said certain value. Accordingly the compressor operates to circulate such refrigerant from the crankcase and suction chamber into the discharge chamber which is in open communication with the condenser and is on the high pressure side of the system even though the evaporator is not functioning for cooling. Thus the compressor crankcase pressure is retained above a certain value even though vaporization is not taking place in the evaporator 40. When the compressor is not operating, the pressures on the high and low pressure sides of the system equalize to thereby insure that the pressure in the crankcase is maintained above the aforesaid certain value.

From the foregoing it will be apparent that there has been described and illustrated a refrigerating system whereby the compressor may operate continuously in a satisfactory manner. Furthermore the arrangement is such as to prevent loss of lubricant from the crankcase by maintaining adequate pressures therein to prevent pumping out action during periods when little or no refrigeration is required. By the arrangement of the float valve the pressures in the high and low pressure sides of the system may be quickly equalized upon the halting or stopping of the compressor to permit a free turning compressor during the initial starting period. However, the float valve arrangement does not interfere with normal refrigeration.

Although a preferred form has been illustrated and described in detail, it will be apparent to those skilled in the art that various other modifications may be made therein without departing from the spirit of the invention or from the scope of the appended claims.

I claim:

1. Refrigerating apparatus comprising in combination an evaporator, a condenser, a compressor operable continuously and at variable speeds for withdrawing vaporized refrigerant from said evaporator and delivering it to said condenser, means responsive to the refrigerant pressures in said evaporator for controlling the withdrawal of refrigerant therefrom by said compressor, a crankcase in said compressor, and a control means responsive to the pressures in said crankcase for diverting delivery of some of said refrigerant directly into said crankcase to maintain said crankcase at above atmospheric pressure.

2. In a refrigerating apparatus comprising in combination an evaporator, condenser and a compressor operable continuously and at variable speeds for withdrawing vaporized refrigerant from said evaporator and delivering it to said condenser, means responsive to the refrigerant pressures in said evaporator for controlling the withdrawal of refrigerant therefrom by said compressor, a crankcase in said compressor, a control means responsive to the pressures in said crankcase for diverting delivery of some of said refrigerant from said condenser to said crankcase, and a restrictive means for metering the withdrawal of refrigerant from said crankcase by said compressor to maintain said crankcase at a minimum operating pressure.

3. In a compressor of the class described having an inlet and outlet chamber, a crankcase adjacent to said chambers, a passage between said outlet chamber and said crankcase, a restrictive passage between said crankcase and said inlet chamber, and means responsive to the pressure in said crankcase for controlling communication through said first mentioned passage.

4. In a compressor of the class described having an inlet and outlet chamber, a crankcase adjacent to said chambers, a passage between said outlet chamber and said crankcase, a passage between said crankcase and said inlet chamber to permit a lesser flow therethrough than said first mentioned passage, and a pressure control means associated with said first mentioned passage to regulate the flow therethrough to said crankcase to maintain a predetermined minimum operating pressure therein.

5. In a refrigerating system a condenser, an evaporator and a compressor having a crankcase, a vapor return conduit connecting said evaporator with inlet to said compressor, outlet of said compressor connected with said condenser, a small diameter conduit connecting said condenser to said evaporator, said compressor operable continuously for withdrawing vaporized refrigerant through said vapor return conduit and delivering it to said condenser, a control means responsive to pressure of the refrigerant in said evaporator for opening or closing said vapor return conduit to flow of refrigerant therethrough, passages interconnecting the outlet and inlet of said compressor with said crankcase, and valve means associated with said interconnecting passages responsive to pressures in said crankcase for regulating the flow therethrough.

References Cited in the file of this patent

UNITED STATES PATENTS

| | | |
|---|---|---|
| 1,830,022 | Fourness | Nov. 3, 1931 |
| 2,080,288 | McCormack | May 11, 1937 |
| 2,145,354 | Hull | Jan. 31, 1939 |
| 2,155,051 | Kagi | Apr. 18, 1939 |
| 2,264,821 | Zukoski | Dec. 2, 1941 |
| 2,286,961 | Hanson | June 16, 1942 |
| 2,344,864 | Griswold | Mar. 21, 1944 |
| 2,418,853 | Shoemaker | Apr. 15, 1947 |
| 2,614,393 | Schulz et al. | Oct. 21, 1952 |